United States Patent
Arulambalam et al.

(10) Patent No.: US 7,610,444 B2
(45) Date of Patent: Oct. 27, 2009

(54) METHOD AND APPARATUS FOR DISK ADDRESS AND TRANSFER SIZE MANAGEMENT

(75) Inventors: Ambalavanar Arulambalam, Macungie, PA (US); Richard J Byrne, Hillsborough, NJ (US); Nevin C. Heintze, Bethlehem, PA (US); Qian Gao Xu, Shanghai (CN); Jun Chao Zhao, Shanghai (CN)

(73) Assignee: Agere Systems Inc., Allentown, PA (US)

( * ) Notice: Subject to any disclaimer, the term of this patent is extended or adjusted under 35 U.S.C. 154(b) by 353 days.

(21) Appl. No.: 11/539,350

(22) Filed: Oct. 6, 2006

(65) Prior Publication Data

US 2007/0219936 A1    Sep. 20, 2007

Related U.S. Application Data

(63) Continuation-in-part of application No. 11/384,975, filed on Mar. 20, 2006, and a continuation-in-part of application No. 11/364,979, filed on Feb. 28, 2006, and a continuation-in-part of application No. 11/273,750, filed on Nov. 15, 2005, now Pat. No. 7,461,214, and a continuation-in-part of application No. 11/226,507, filed on Sep. 13, 2005.

(60) Provisional application No. 60/724,692, filed on Oct. 7, 2005, provisional application No. 60/724,722, filed on Oct. 7, 2005, provisional application No. 60/725,060, filed on Oct. 7, 2005, provisional application No. 60/724,573, filed on Oct. 7, 2005.

(51) Int. Cl.
    *G06F 5/10* (2006.01)

(52) U.S. Cl. .................... 711/112; 711/114

(58) Field of Classification Search .............. None
    See application file for complete search history.

(56) References Cited

U.S. PATENT DOCUMENTS

| | | | |
|---|---|---|---|
| 5,371,877 A | 12/1994 | Drako et al. | |
| 5,553,269 A | 9/1996 | Nunes | |
| 5,659,687 A | 8/1997 | Kim et al. | |
| 5,937,169 A | 8/1999 | Connery et al. | |
| 5,968,143 A * | 10/1999 | Chisholm et al. | 710/23 |
| 5,974,482 A | 10/1999 | Gerhart | |

(Continued)

OTHER PUBLICATIONS

ARM, AMBA AXI Protocol v 1.0 Specification, Copyright 2003, 2004, 108 pages.

(Continued)

*Primary Examiner*—Sanjiv Shah
*Assistant Examiner*—Ngoc V Dinh (57) ABSTRACT

A method includes storing first and second sets of parameters in a register. Each set of parameters defines a storage transaction to store data to a computer readable medium or a retrieval transaction to retrieve data from the computer readable medium. The first storage or retrieval transaction is performed according to the first set of parameters. The second set of parameters is retrieved from the register automatically when the first storage or retrieval transaction is completed, without waiting for a further command from a control processor. The second storage or retrieval transaction is performed according to the retrieved second set of parameters. A system for performing the method and a computer readable medium containing pseudocode for generating an application specific integrated circuit that performs the method are provided.

19 Claims, 6 Drawing Sheets

U.S. PATENT DOCUMENTS

| | | | |
|---|---|---|---|
| 6,157,964 A * | 12/2000 | Young | 710/5 |
| 6,185,631 B1 * | 2/2001 | Casper et al. | 710/20 |
| 6,449,656 B1 | 9/2002 | Elzur et al. | |
| 6,453,394 B2 | 9/2002 | Miki et al. | |
| 6,697,868 B2 | 2/2004 | Craft et al. | |
| 6,697,885 B1 * | 2/2004 | Goodfellow | 710/22 |
| 6,732,252 B2 | 5/2004 | Miki et al. | |
| 6,788,704 B1 | 9/2004 | Lindsay | |
| 6,868,459 B1 | 3/2005 | Stuber | |
| 6,876,941 B2 | 4/2005 | Nightingale | |
| 6,920,510 B2 | 7/2005 | Chang et al. | |
| 2004/0042483 A1 | 3/2004 | Elzur et al. | |
| 2004/0133713 A1 | 7/2004 | Elzur | |
| 2004/0153578 A1 | 8/2004 | Elzur | |
| 2004/0249957 A1 | 12/2004 | Ekis et al. | |
| 2006/0075287 A1 * | 4/2006 | Vageline et al. | 714/5 |

OTHER PUBLICATIONS

Tanenbaum, Andrew S., Structured Computer Organization, 1984, Prentice-Hall, Inc., pp. 10-12.
ARM, The Architecture for the Digital World, http://www.arm.com/products/CPUs/, Sep. 01, 2005.
ARM, The Architecture for the Digital World, http://www.arm.com/contact_us/offices.html/, Sep. 01, 2005.
Information Sciences Institute University of Southern California, Transmission Control Protocol Darpa Internet Program Protocol Specification, Sep. 1981, pp. 1-88, Marina del Rey, California.
ARM, Advanced High-Performed Bus (AHB), AMBA AHB, ARM IHI 0011A, Copyright ARM Limited 1999, Chapter 3, pp. 3-1-3-54.
ARM, AMBA Specification, Rev. 2.0 Arm, 1999, 34 pages.

* cited by examiner

| Word | 31 | 30 29 | 28 27 | 26 25 24 23 | 22 21 20 | 19 18 17 | 16 15 14 13 12 11 10 9 8 7 6 5 4 | 3 2 1 0 |
|---|---|---|---|---|---|---|---|---|
| 0 | T | RES | QID[5:0] | RAC[3:0] | RES | | LENGTH[12:0] | DSA[35:32] |
| 1 | DSA[31:0] ||||||||
| 2 to N+1 | DATA [Bytes 0 = 512*N, N = LENGTH[12:0]] ||||||||

FIG.5

| Word | 31 | 30 29 | 28 27 | 26 25 24 23 | 22 21 20 | 19 18 17 | 16 15 14 13 12 11 10 9 8 7 6 5 4 | 3 2 1 0 |
|---|---|---|---|---|---|---|---|---|
| 0 | T | RES | QID[5:0] | RAC[3:0] | RES | | LENGTH[12:0] | DSA[35:32] |
| 1 | DSA[31:0] ||||||||

FIG.6

| Word | 31 | 30 29 | 28 27 | 26 25 24 23 | 22 21 20 | 19 18 17 | 16 15 14 13 12 11 10 9 8 7 6 5 4 | 3 2 1 0 |
|---|---|---|---|---|---|---|---|---|
| 0 | T | RES | QID[5:0] | | RES | | LENGTH[12:0] | |
| 1 | DSA[31:0] ||||||||
| 1 to N | DATA [Bytes 0 = 512*N, N = LENGTH[12:0]] ||||||||

METHOD AND APPARATUS FOR DISK
ADDRESS AND TRANSFER SIZE
MANAGEMENT

This application is a continuation-in-part of U.S. patent application Ser. No. 11/226,507, filed Sep. 13, 2005, and is a continuation-in-part of U.S. patent application Ser. No. 11/273,750, filed Nov. 15, 2005, issued as U.S. Pat. No. 7,461,214 on Dec. 2, 2008 and is a continuation-in-part of U.S. patent application Ser. No. 11/364,979, filed Feb. 28, 2006, and is a continuation-in-part of U.S. patent application Ser. No. 11/384,975, filed Mar. 20, 2006, and claims the benefit of U.S. provisional patent application Nos. 60/724,692, filed Oct. 7, 2005, 60/724,722, filed Oct. 7, 2005, 60/725,060, filed Oct. 7, 2005 and 60/724,573, filed Oct. 7, 2005, all of which are expressly incorporated by reference herein in their entireties.

FIELD OF THE INVENTION

The present invention relates to management of a plurality of data transfers to and from storage media.

BACKGROUND

Media server products offer both broadband connectivity and hard disk drive-based storage. In a typical media server product, incoming signals are received and stored to a hard disk drive, and if watched "live," the signals are played back from the hard disk drive, after a short delay.

Solutions are desired to increase the functionality of media servers, and reduce the latencies in the storage and retrieval processes.

SUMMARY OF THE INVENTION

In some embodiments, a method includes storing first and second sets of parameters in a register. Each set of parameters defines a storage transaction to store data to a computer readable medium or a retrieval transaction to retrieve data from the computer readable medium. The first storage or retrieval transaction is performed according to the first set of parameters. The second set of parameters is retrieved from the register automatically when the first storage or retrieval transaction is completed, without waiting for a further command from a control processor. The second storage or retrieval transaction is performed according to the retrieved second set of parameters.

DETAILED DESCRIPTION

This description of the exemplary embodiments is intended to be read in connection with the accompanying drawings, which are to be considered part of the entire written description.

In a home media server application, data from multiple sessions are either being stored to or retrieved from disk. A method and apparatus are described below to compute the number of sectors transferred during a transaction and the address in disk to be accessed. An efficient process uses minimal control processor intervention to handle multiple transactions concurrently.

Figure 1:
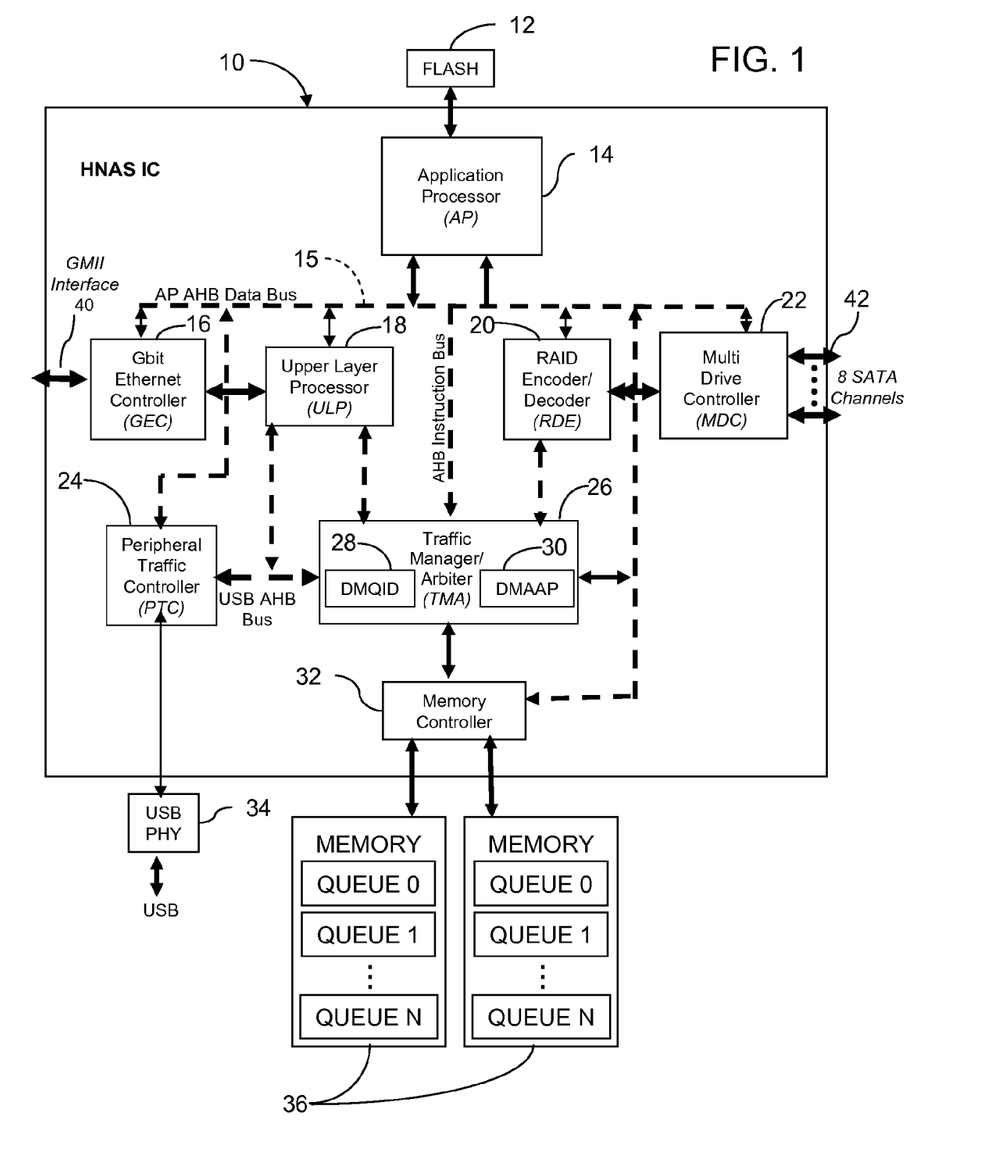
FIG. 1 is a block diagram of a home network attached server system.

FIG. 1 is a block diagram of an exemplary home network attached storage (HNAS) system 10 for a home media server application. Intermediate storage is provided in a memory 36 (e.g., DDR II memory or other memory type) while storing incoming data from the network (for example, via gigabit Ethernet controller (GEC) 16 and gigabit media independent interface (GMII) 40), or while streaming out data from the disk 42 toward the network interface 40. Also, control traffic from or to an application (or control) processor AP 14 is managed in the memory 36. Memory 36 contains data stream queues comprising a plurality of buffers used to manage the simultaneous data streams.

An exemplary embodiment provides an efficient way to manage multiple media streams and control traffic in the intermediate memory 36. The example involves: a queue structure, management of queues of different streams, and control of the amount of data to be stored in a queue. The example also provides mechanisms to determine when a queue becomes eligible to be streamed, by defining emptying and refilling policies.

In one exemplary HNAS system 10, data from multiple sessions are simultaneously being stored to a disk array 42 by a multi-drive controller (MDC) 22, played out to devices on a home network via the universal serial bus (USB) interface 34, and used for control traffic on an application processor (AP) advance high-performance bus (AHB) 15. A queuing structure efficiently manages all these traffic flows. In some embodiments, the traffic management of memory and bandwidth may be performed in hardware.

FIG. 1 shows the traffic management/arbiter (TMA) block 26 in the HNAS media server device 10. The TMA block 26 manages media traffic arriving on the Ethernet 16 or USB port 34, control traffic arriving for the processor 14, which may be an embedded ARM application processor (AP 14), and playback traffic during disk retrieval. (Although the example includes an embedded ARM926EJ-S core by ARM Holdings, plc, Cambridge, UK, or other embedded microprocessor, other embedded processors may be used). TMA 26 may include a buffer manager and scheduler (not shown). An upper layer protocol (ULP) protocol accelerator 18 includes hardware that performs routine network, transport and application layer communications protocol processing, to offload these tasks from the application processor (AP) 14.

Figure 2:
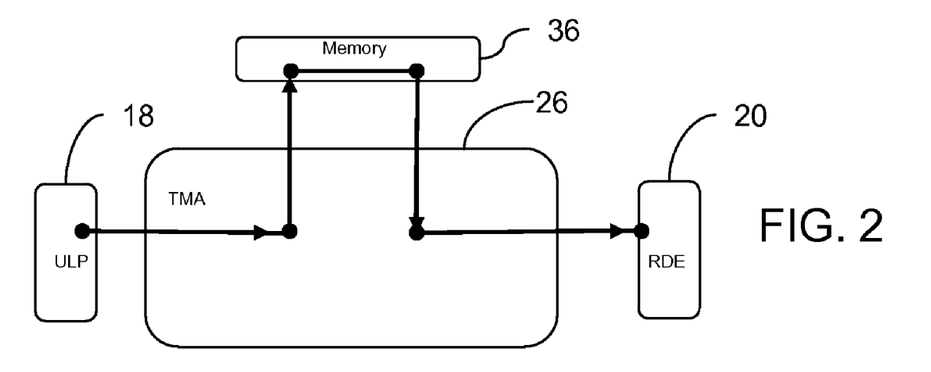
FIG. 2 is a diagram showing storage data flows.

FIG. 2 shows the data storage flows for a storage process. The media objects and control traffic are received and first processed by a local area network (LAN) interface, such as a Gigabit Ethernet Controller (GEC) 16, and protocol accelerator 18. Protocol accelerator 18 transfers the media objects and control traffic to TMA 26, and TMA 26 stores the arriving traffic in the shared memory 36. In the case of media object transfers, the incoming object data are stored in memory 36, and transferred to the disks 42 for storage, via the Redundant Array of Inexpensive Disks (RAID) decoder/encoder (RDE) block 20 and the multi-drive controller (MDC) 22.

Figure 3:
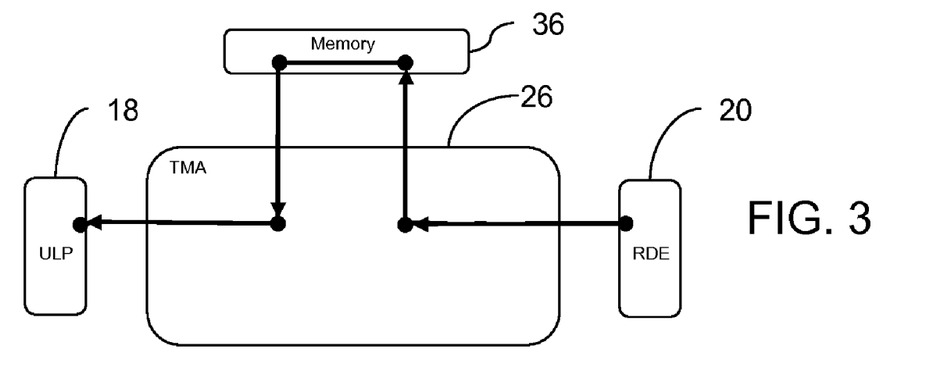
FIG. 3 is a diagram showing retrieval data flows.

FIG. 3 shows the data storage flows for a retrieval process. TMA 26 also manages the retrieval requests from disk 42 toward the output port (e.g., USB port) 34. During media playback requests, the data are transferred from the disks 42 and stored in memory 36, and then transferred out to the USB port 34 via protocol accelerator 18. TMA 26 manages the storage and retrieval process by providing the appropriate control information to RDE 20.

FIG. 1 also shows a control traffic bus, which may be an Advanced Microcontroller Bus Architecture (AMBA) Advanced High-performance Bus (AHB) 15, and which serves as an instruction bus for AP 14. The control data destined for inspection by AP 14 are stored in the shared memory 36, and AP 14 is given access to read the packets in memory 36. AP 14 also uses this mechanism to re-order any of the packets received out-of-order. A part of the shared memory 36 and disk 42 contains program instructions and data for AP 14. TMA 26 manages the access to the memory 36 and disk 42 by transferring control information from the disk 42 to memory 36 and memory 36 to disk 42. TMA 26 also enables AP 14 to insert data and extract data to and from an existing packet stream.

As used herein, the term session broadly covers an open connection that has activity in which data are being re-assembled from the media interface 40, being read out from the disk 42 and stored into memory 36 for playback, or an open session used by the control processor (AP 14) for processor functions. To facilitate these transfers in and out of memory 36, TMA 26 maintains session queues. The queues (and corresponding sessions) are identified by queue identifier (QID).

As the user initiates additional storage and playback operations, new sessions are started, and the corresponding data structures are set up. As these storage and playback operations are completed, the sessions are automatically torn down. Additionally, the control processor AP 14 initiates data transfers (e.g., instruction retrieval) that result in additional sessions being set up and torn down. The exemplary system 10 can accommodate up to 64 simultaneous sessions. Other embodiments may accommodate more or fewer simultaneous sessions.

To deal with the data transfer between memory 36 and disk 42, the TMA 26 includes a register table, QID Disk Access (DMQID) Table 28. Each QID has a corresponding entry in DMQID table 28. Table 1 provides an example of a format and content for the DMQID table 28. One of ordinary skill in the art can readily identify alternative formats for conveying the same or similar information.

In some embodiments, multiple levels of transfer size control are provided. For example, given an entire file length=X bytes, software and/or hardware controls may allow the transfer to be broken into smaller units, for efficiently and fairly distributing available bandwidth among multiple queues (sessions).

Each file to be stored may be broken up into a number of blocks, the size of which can be controlled by AP 14 via values in the CLEN or PLEN fields under software control. In some embodiments, AP 14 determines the values CLEN and PLEN for each application type. In other embodiments, AP 14 determines the values CLEN and PLEN individually for each application. In both cases, AP 14 stores the values of CLEN and PLEN in the DMQID register table 28, where they are accessible by hardware without intervention or delay by AP 14.

In some embodiments, each block is a set of contiguous sectors in the disk. If the disk is fragmented, each block may be located at a different physical location and may have a different number of contiguous sectors. AP 14 can set the CLEN and PLEN parameters for each block individually, based on the number of contiguous sectors in the block. In some embodiments, AP 14 also enforces a maximum value of CLEN/PLEN, so that the entire file is not sent in a single massive transfer in the event that the disk is not fragmented and the entire file is stored contiguously.

Each block (CLEN/PLEN transfer) may be further broken into units (requests) of xfersize sectors per transaction, under hardware control. It is possible to transfer the entire number of sectors programmed in CLEN/PLEN (e.g., an entire block or file) for a QID session at once with a single disk write operation. However, if a very large transfer is performed all at

TABLE I

QID Disk Access Table (rDMQID[n])

| Bit Widths | Field | Type | Description |
| --- | --- | --- | --- |
| 1 | ActiveXfer | RW | Active Transfer Indicator. This bit indicates which of the two (current, pending) sector address/length pair is active. 0: CDSA/CXferLen is active 1: PDSA/PXferLen is active |
| 23 | CLen | RW | Current DSA Transfer Length of the object in 512 byte contiguous Sectors. This value is decremented by the XferSize after each transfer request, until the value becomes zero. |
| 36 | CDSA | RW | Current Starting Data Sector Address. A Data Sector Address (DSA) is a means of referring to data sector units on a disk array with a numerical address. With a DSA, the data sectors are numbered sequentially from zero to D-1 where D is the number of Data Sector Units on an array. Parity Sector Units are not included in a DSA, the sequential numbering is not advanced for Parity Sector Units. This value is incremented by the XferSize as soon as the request for transfer is provided to the RDE. |
| 23 | PLen | RW | Pending DSA Transfer Length of the object in 512 byte contiguous Sectors. |
| 36 | PDSA | RW | Pending Starting Data Sector Address. |
| 10 | LstSecFsz | RW | Last Sector Fill Size. The valid bytes in the last sector during storage or retrieval process. This is used to fill padding data during storage or discard empty bytes during playback. This value must be programmed to 512 when padding or pad removal is not required. |
| 16 | XferSize | RW | Transfer Size per Request. This field indicates the number of data sectors transferred per request. This value is tuned to optimize the disk access performance. |
| 4 | ArrayGroup | RW | Array Group. The array group ID for RDE, such that the proper array group configuration is used for the disk access. |
| 16 | Weight | RW | Weight. This field indicates the relative priorities among QIDs for disk access. In the case of storage the larger the weight, higher the priority is. In the case of retrieval, the lower the weight, the higher the priority. | once, no other queues would be able to perform retrieval or storage operations during this large write operation. This could cause the other queues to starve and lead to buffer overflow (during storage) or increased latency in transferring delay-sensitive data, such as video. Therefore, the overall transfer may be further broken up into smaller transfers.

This smaller request size is determined by the use of Xfer-Size parameter. Therefore, each time a given number (Xfer-Size) of sectors are transferred (i.e., for each request), a scheduling decision is performed by TMA 26 to decide which session (QID) is the most eligible queue to be served next. By using the xfersize parameter for dividing a transaction (contiguous object) into smaller request units, this method provides a flexible solution, in which the application associated with this QID decides how to initially break up the transfers into objects (transactions), and TMA 26 may further break up the objects into smaller request units (of XferSize sectors) to optimize overall system performance.

In some embodiments, the value of the XferSize parameter is determined empirically to optimize performance for the type of data processed by the system. Three factors which influence performance (and the value selected for XferSize include: disk type, application type, and amount of available buffer space in memory 36. Thus, one of ordinary skill can readily optimize the value of XferSize for a given combination of these three factors.

During the storage process (as shown in FIG. 2), data are read from memory 36 and written into the disk 42 (via the MDC 22). Two sets of parameters, "Current" and "Pending" are provided, such that the TMA 26 alternates between the two queues for the writes. As soon as one of the write transaction is completed, the other write transaction can be started, based on the other set of parameters in DMQID table 28, without waiting for further instruction from AP 14. While a second write transaction is being performed, AP 14 can overwrite the first set of parameters in the DMQID table 28 with a new set of parameters corresponding to a third write transaction, to prepare for the third write transaction, and so forth.

The current set includes the current DSA transfer length (Clen) and the current starting data sector address (CDSA). The pending set includes the pending DSA transfer length (Plen) and the pending starting data sector address (PDSA). Initially, the current length Clen (or Plen) equals the whole object size. As each request is serviced, an amount of content equal to the XferSize is written to the disk via the MDC block; the remaining length Clen (or Plen) is reduced by XferSize, and the CDSA (or PDSA) is increased by Xfersize. When Clen (or Plen) is equal to zero, the active indicator ActiveXfer points to the pending (current) address/length pair, and the transfer begins from the indicated address. Thus, the active transfer toggles back and forth between the transfer described by the current set and the transfer described by the pending set. An interrupt is generated, so that the AP 14 is alerted to refill the inactive descriptor parameters. This process continues until the entire object is written into the disk 42. The following pseudocode summarizes the required operations performed by TMA 26 to determine the size of transfer.

```
i = getQID ( ); // This is the selected QID for storage
if (rDMQID [i] .ActiveXfer) = = 0 AND rDMQID [i] .CLEN > 0) {
              XferSize = min (rDMQID [i] .XferSize, rDMQID
              [i] .CLEN);
      rDMQID [i] .CDSA = rDMQID [i] .CDSA + XferSize;
      rDMQID [i] .CLEN = rDMQID [i] .CLEN – XferSize;
              if (rDMQID[i] .CLEN) = = 0) {
      rDMQID [i] .ActiveXfer = 0x1;
```

```
              GenInterrupt (FillRequest) ;
                      if (rDMQID [i] .PLEN) = = 0) {
              // Object Transfer is complete
              GenInterrupt (TransferComplete);
                      }
              }
      }
}
if (rDMQID [i] .ActiveXfer) = = 1 AND rDMQID [i] .PLEN > 0) {
      XferSize = min (rDMQID [i] .XferSize, rDMQID [i] .PLEN);
      rDMQID [i] . PDSA = rDMQID [i] .PDSA + XferSize;
      rDMQID [i] .PLEN = rDMQID [i] .PLEN – XferSize;
              if (rDMQID [i] .PLEN) = = 0) {
      rDMQID [i] .ActiveXfer = 0x0;
      GenInterrupt (FillRequest);
                      if (rDMQID [i] .CLEN) = = 0) {
              // Object Transfer is complete
              GenInterrupt (TransferComplete);
                      }
              }
}
```

The first (current) set and the second (pending) set of parameters for storage/retrieval can operate in a ping pong manner. For example, while storing a very large file, the storage within the disk 42 may not be contiguous (due to disk fragmentation). So a first set of contiguous sectors in the disk may be programmed via the first (Current) set and another set of contiguous sectors may be programmed via the second (pending) set. As performed by the pseudocode above, the hardware in TMA 26 automatically switches to the second (pending) set of sectors when the first (current) set of sectors is completed and sets the interrupt. Upon receiving the interrupt, a software process in the application processor AP 14 populates a new set of parameters in the register fields for the current set in rDMQID[n]. In the mean time, the hardware of TMA 26 is operating on the transfer of the sectors defined in the pending set. When the pending set is completed, the hardware of TMA 26 switches back to the current set. This operation will continue until the entire file (comprising a plurality of objects, each occupying a plurality of contiguous sectors) is transferred.

Thus, in some situations, the current and pending register sets are populated very often and the hardware of TMA 26 switches back and forth many times to transfer a single file. The ActiveXfer bit keeps track of which set of registers is being used by the hardware of TMA 26 at any given time. Because the table rDMQID[n] is already stored in the register 28, while AP 14 populates one set of the parameters, the hardware of TMA 26 does not have to remain idle; it can immediately begin working on the other set. This improves the overall throughput performance.

Figure 7:
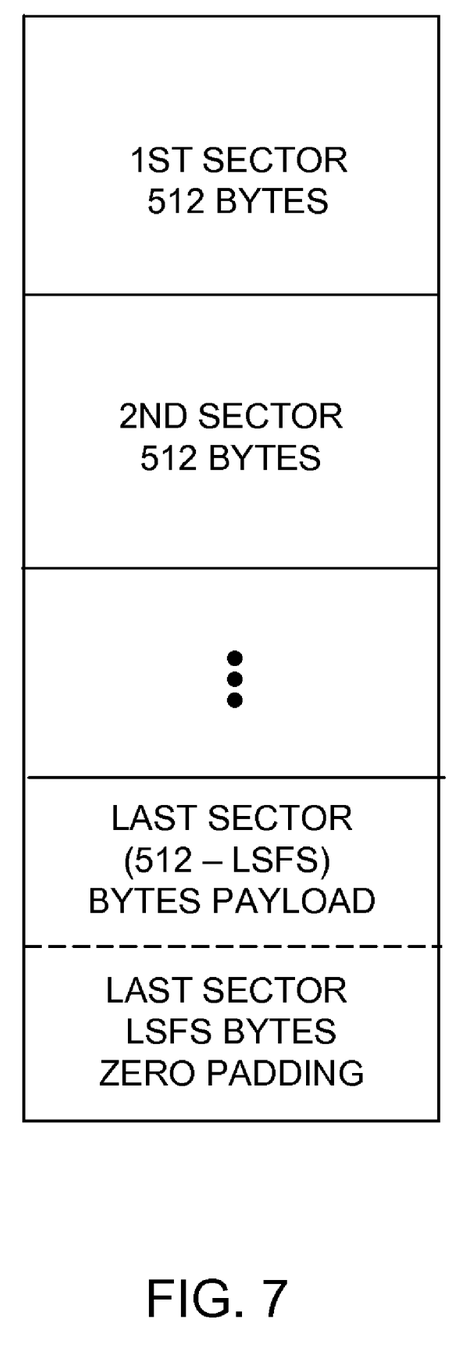
FIG. 7 is a diagram of a data transfer, including data padding in the final sector.

FIG. 7 shows an example of a multi-sector data object being transferred. The number of bytes provided to RDE 20 is a multiple of 512 bytes. TMA 26 performs padding within a sector, if the number of bytes of content is less than the sector size. So, for example, while sending a final transaction of data that does not fill out its final sector, TMA 26 pads out the data with zeros to make a full, complete sector, as shown in FIG. 7. In cases where the last sector sent out contains padded data, the rDMQID[i].LstSecSz parameter is used to determine the number of valid bytes in the data received. TMA 26 adds these bytes and writes only the user data to the memory 36.

Table 1 is also used for retrieval sessions. During the retrieval process, data are read from disk 42 and written into the memory 36 (as shown in FIG. 3). Two sets of descriptors, Current and Pending, are provided such that the TMA 26 alternates between the two for the reads. At each transaction an amount of content data equal to the XferSize is read from the disk 42. Initially, the current length Clen (or Plen) equals the whole object size. At each transaction, an amount of content equal to the XferSize is retrieved from the disk 42 via the MDC 22; the remaining length Clen (or Plen) is reduced by XferSize, and the CDSA (or PDSA) is increased by Xfersize. When the remaining length Clen (or Plen) is equal to zero, the active indicator points to the pending address/length pair, and the transfer begins from the indicated address. An interrupt is generated and transmitted to AP 14, so that the control processor can refill the inactive descriptor parameters. The new set of parameters is then available in the register table DMQID 28 before it is to be used. This process continues until the entire object is retrieved from the disk 42.

During a retrieval operation, since the number of bytes provided by RDE 20 is a multiple of 512 bytes, the retrieved data may include padding, if the actual content (payload) does not occupy an even multiple of 512 bytes. In cases where the last sector read out contains padded data, the rDMQID[i].LstSecSz parameter is used to determine the number of valid bytes in the data received. TMA 26 discards a number of bytes equal to LstSecFsz (the padding bytes) and writes only the user data to the memory 36.

In a media server application, AP 14 accesses applications and meta-data stored in the control portion of the disk 36. In some embodiments, to enhance performance, this process does not utilize the QID queues in memory 36. In order to accomplish access by AP 14, the data from disk 42 are loaded into the shared memory 26, and the data are used by AP 14. This procedure is similar to the retrieval process described above. In the same way, AP 14 transfers data stored in memory 36 to disk 42 after processing data in memory 36. This is similar to the storage process described above. To deal with these two data transfer processes, TMA 26 uses another register table, AP Disk and Memory Access Table (DMAAP) 30. Table II provides an example of the form and content of the DMAAP table 30 for some embodiments.

The DMAAP table 30 is used for the integration of storage and retrieval processes. rDMAAP.RqstType indicates whether the request is for a storage or retrieval disk operation. The default value, 0x0 indicates a storage process, and 0x1 indicates a retrieval processes. In some embodiments, at any given time, only one type of DMAAP table 30 transfer is in progress, between the disk 42 and memory 36.

During the storage operation process of DMAAP table 30, data are read from memory 36 and written into the disk 42. Transfer Length (Len) and Start DSA (DSA) are provided, so that the TMA 26 can complete the disk write via multiple transactions. At each transaction a number of content bytes equal to the XferSize is written to the disk 42. When the remaining length Len is equal to zero, the TMA 26 starts another transaction. This process continues until the entire object is written into the disk 42. Then, an interrupt is generated and transmitted to AP 14. The length of padding data in the last sector can be calculated via the rDMQID[i].LstSecFsz parameter.

During the retrieval operation process of DMAAP table 30, data are read from disk 42 and written into the memory 36. Transfer Length and Start DSA are provided such that the TMA 26 can complete the disk read via multiple transactions. At each transaction the number of content (payload) bytes equal to the XferSize is written to the memory 36. When the remaining length is equal to zero, TMA 26 starts another transaction. This process continues until the entire object is read out from disk 42. Then, an interrupt is generated and transmitted to AP 14. The length of padding data in the last sector can be calculated via the rDMQID[i].LstSecFsz parameter.

Figure 4:
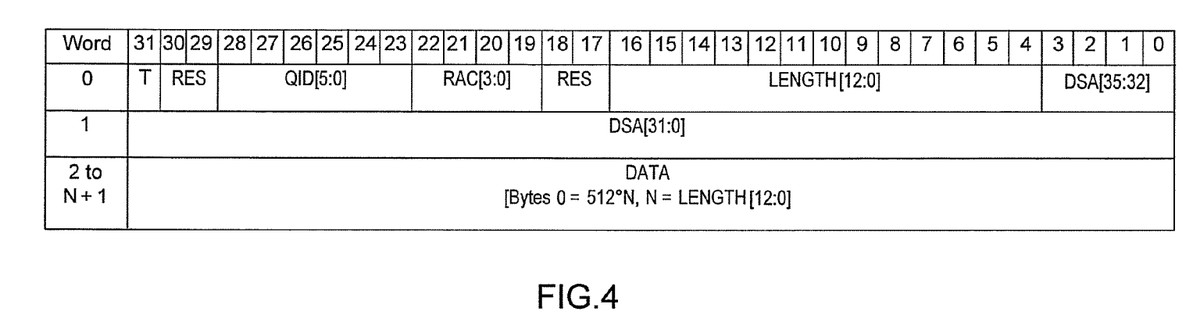
FIGS. 4-6 are data structure diagrams for the interface between the TMA and RDE of FIG. 1.

FIG. 4 shows an example of a TMA to RDE interface storage request data format (T=0). The field definitions are provided in Table 3, which also applies to the fields shown in FIGS. 5 and 6.

TABLE 2

Disk and Memory AP Access Table (DMAAP)

| Bit Widths | Field | Type | Description |
|---|---|---|---|
| 1 | RqstType | RW | Request Type. This bit indicates if the request is for a storage or retrieval disk operation.<br>0: Storage (default)<br>1: Retrieval |
| 23 | Len | RW | DSA Transfer Length of the object in 512 byte contiguous Sectors. This value is decremented by the XferSize after each transfer request, until the value becomes zero. |
| 36 | DSA | RW | Starting Data Sector Address. A Data Sector Address (DSA) is a means of referring to data sector units on a disk array with a numerical address. With a DSA, the data sectors are numbered sequentially from zero to D-1 where D is the number of Data Sector Units on an array. Parity Sector Units are not included in a DSA, the sequential numbering is not advanced for Parity Sector Units. This value is incremented by the XferSize as soon as the request for transfer is provided to the RDE. |
| 1 | Enable | RW | Enable. When this bit is set the process begins.<br>0: Disable (default)<br>1: Enable |
| 10 | LstSecFsz | RW | Last Sector Fill Size. The valid bytes in the last sector during storage or retrieval process. This is used to pad or discard empty bytes during reassembly or playback. |
| 16 | XferSize | RW | Transfer Size per Request. This field indicates the amount of data sectors transferred per request. This value is tuned to optimize the disk access performance. |
| 4 | ArrayGroup | RW | Array Group. The array group ID for RDE, such that the proper array group configuration is used for the disk access. |
| 27 | MemAddr | RW | Memory Address. This field indicates the address of memory to write the retrieved data from the disk, or the address of the memory to read the data to store the disk. |

TABLE 3

| Word | Bits | Field | Description |
|---|---|---|---|
| 0 | 31 | T | Type. This field is set by the TMA depending on the type of request.<br>0: Storage Request (Data field contains data)<br>1: Retrieval request |
|  | 30:24 | QID(6:0) | Queue Identifier. This field contains the QID the data is retrieved for, or stored for. If QID bit 7 is set to 1, it indicates the transfer is for AP memory manager (AMM) |
|  | 23:20 | RAC(3:0) | Raid Array Cluster |
|  | 19:4 | Length(15:0) | Number of contiguous length of the transfer in number of sectors |
|  | 3:0 | DSA(35:0) | Data sector address. This field contains the starting data sector address to access. |
| 1 | 31:0 |  |  |
| 2 to N + 1<br>N = Length*128 | 31:0 | Data | The user (payload) data being stored. This field is only present during a storage operation (i.e., T = 0) |

Figure 5:
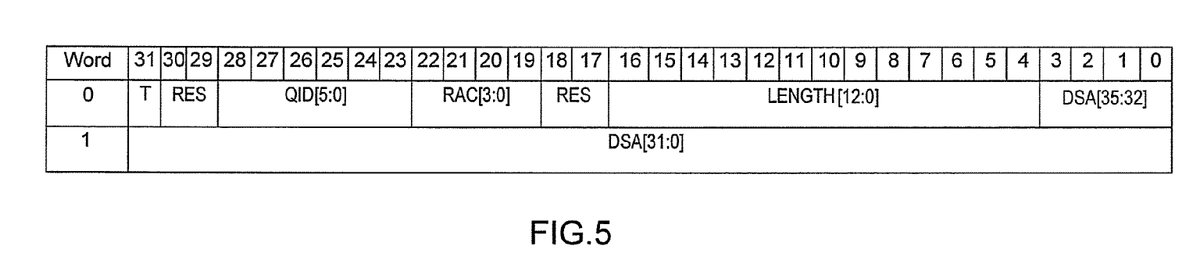

FIG. 5 shows an example of a TMA to RDE interface retrieval request data format (T=1).

Figure 6:
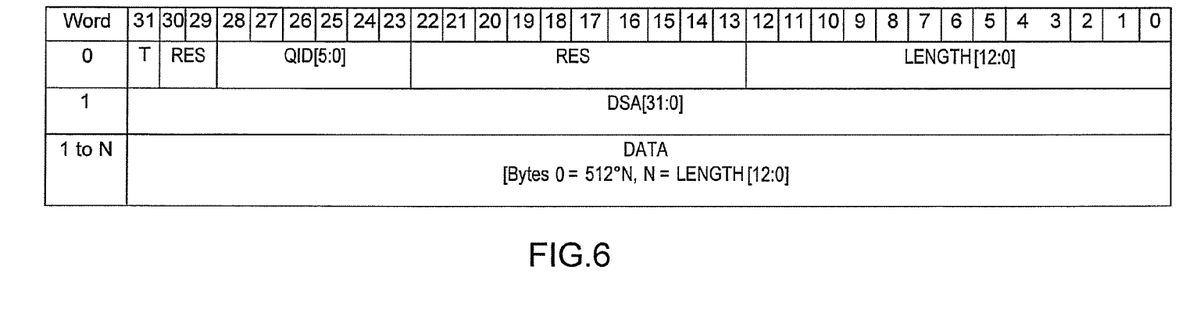

FIG. 6 shows an example of an RDE to TMA interface receive data format.

Providing two alternative sets in the DMQID register table 28 achieves multiple transfers efficiently between disk 42 and memory 36. A single hardware engine can handle the transaction aspects of the storage and retrieval. This minimizes involvement of AP 14 during data transfer. A zero filling mechanism handles the last sector during data transfer. Similarly, the DMAAP table 30 register provides a total solution for managing storage and retrieval transfers between disk 42 and memory 36.

One of ordinary skill in the art understands that the above described data formats are only exemplary in nature, and that other data formats can be readily selected to transmit the information in the tables and figures described above.

Figure 8A:
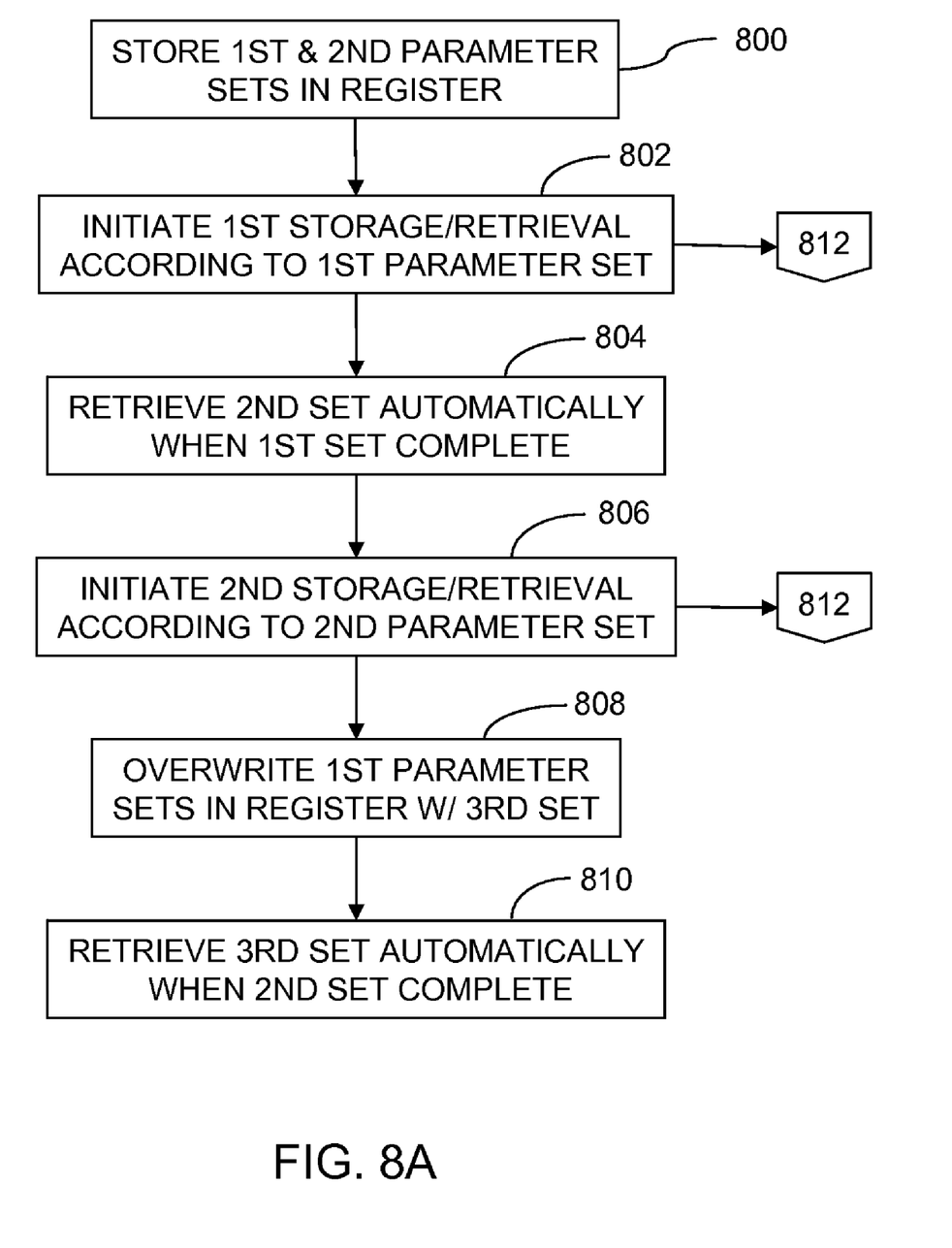
FIGS. 8A and 8B are flow charts of a storage or retrieval transaction.
Figure 8B:
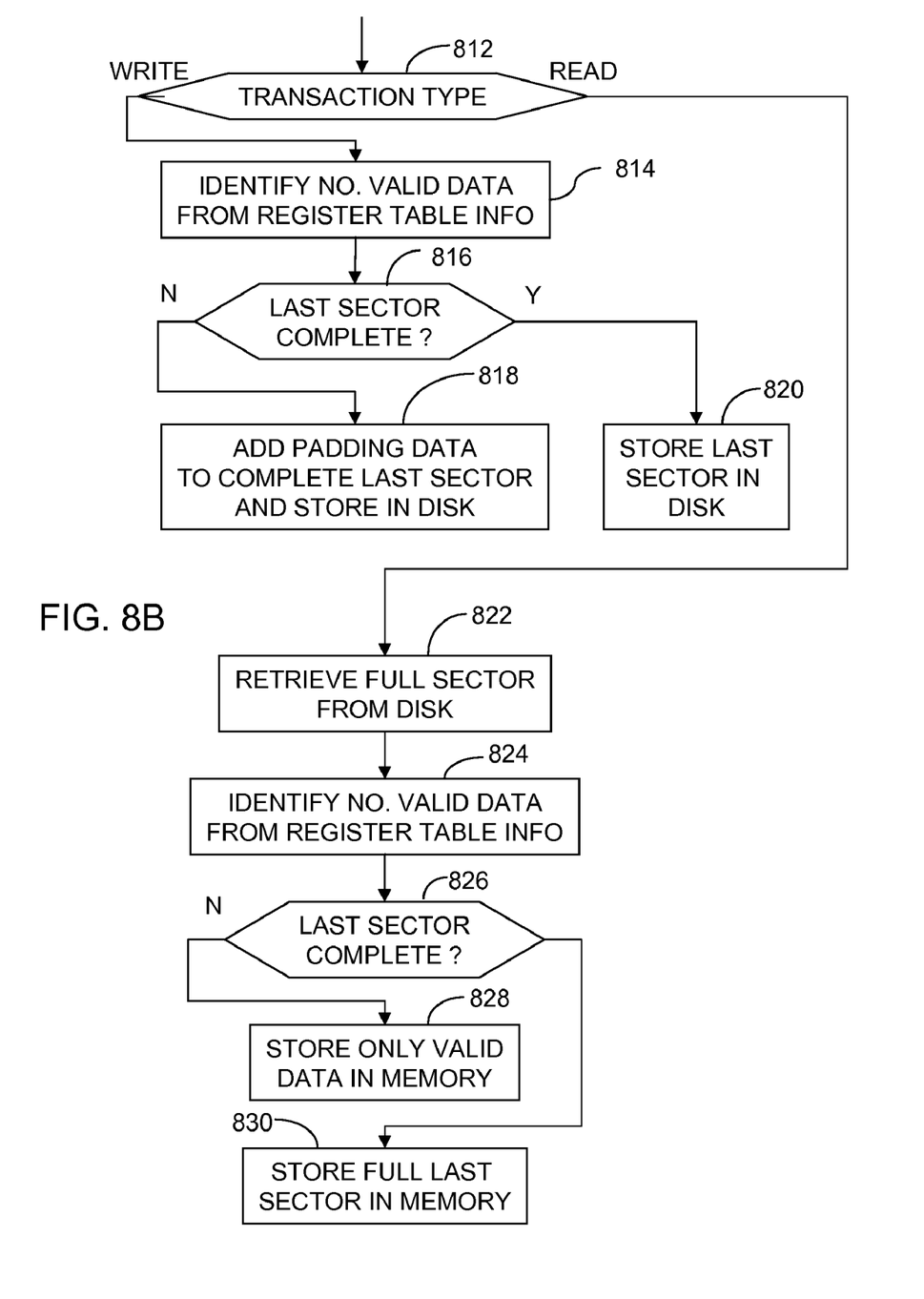

FIGS. 8A and 8B are flow charts showing an example of a sequence of steps for a group of storage or retrieval transactions. Although FIG. 8A only shows the transfer of the first two objects in the data file, one of ordinary skill understands that the same steps are repeated for additional objects. FIG. 8A shows how the storage or retrieval alternates between a transaction defined by the first parameter set in register 28 and a transaction defined by a second parameter set in register 28. FIG. 8B shows steps involved in processing the final sector of each transaction.

At step 800 of FIG. 8A, AP 14 stores the first and second parameter sets in register table DMQID 28.

At step 802, the first storage or retrieval transaction is initiated according to the first parameter set. TMA 26 processes the data and completes the transaction at step 812 (FIG. 8B), and also begins the next transaction at step 804 (FIG. 8A).

At step 804, the second parameter set is retrieved automatically by the hardware of TMA 26 when the first transaction is completed.

At step 806, the second storage or retrieval transaction is initiated according to the second parameter set. TMA 26 processes the data and completes the transaction at step 812 (FIG. 8B), and also begins the next transaction at step 804 (FIG. 8A).

At step 808, AP 14 overwrites the first parameter set fields in register table DMQID 28 with a third parameter set.

At step 810, the third parameter set is retrieved (from the fields where the first set were previously stored) automatically by the hardware of TMA 26 when the second transaction is completed.

Referring to FIG. 8B, at step 812, a determination is made whether the transaction is a read or write transaction. For a write, steps 814-820 are performed. For a read, steps 822-830 are performed.

At step 814, for a write, the number of valid data in the last sector is obtained from the register table DMQID 28.

At step 816, a determination is made whether the last sector is filled with valid data. If the number of valid data is less than the sector size, step 818 is performed. If the number of valid data equals the sector size, step 820 is performed.

At step 818, TMA 26 adds padding data to the last sector and forwards the data to RDE 20 for storage in the disk.

At step 820, TMA 26 forwards the full sector of data to RDE 20 for storage in the disk.

At step 822, for a read transaction, a full sector of data are retrieved from the disk by RDE.

At step 824, TMA 26 identifies the number of valid data in the last sector from register table DMQID 28.

At step 826, a determination is made whether the last sector is complete. If so, then step 830 is performed. If the last sector is incomplete, step 828 is performed.

At step 828, only the valid data are stored in the memory 36.

At step 830, the entire last sector is stored.

In some embodiments, RDE 20 and TMA 26 are implemented in application specific integrated circuitry (ASIC). In some embodiments, the ASIC is designed manually. In some embodiments, a computer readable medium is encoded with pesudocode, wherein, when the pseudocode is processed by a processor, the processor generates GDSII data for fabricating an application specific integrated circuit that performs a method. An example of a suitable software program suitable for generating the GDSII data is "ASTRO" by Synopsys, Inc. of Mountain View, Calif.

In other embodiments, the invention may be embodied in a system having one or more programmable processors and/or coprocessors. The present invention, in sum or in part, can also be embodied in the form of program code embodied in tangible media, such as flash drives, DVDs, CD-ROMs, hard-drives, floppy diskettes, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber-optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method comprising the steps of:
   storing first and second sets of parameters in a register, each set of parameters defining a transaction to transfer data either to or from a computer readable storage medium;
   performing a first transaction according to the first set of parameters;
   retrieving the second set of parameters from the register automatically when the first transaction is completed, without waiting for a further command from a control processor; and
   performing a second transaction according to the retrieved second set of parameters,
   wherein the register additionally stores an indicator that identifies a number of valid data bytes in a final sector of the data stored or retrieved during the transaction, and
   wherein pad data is added to the final sector of the data stored or retrieved during the transaction, to form a full sector of data on the computer readable storage medium, if the number of valid data bytes in the final sector is less than a size of the sector.

2. The method of claim 1, wherein each transaction comprises either a storage transaction or a retrieval transaction where the storage transaction transfers data from a memory to at least one disk, and the retrieval transaction transfers data from the at least one disk to the memory.

3. The method of claim 2, wherein the memory includes a plurality of queues, each queue buffering a respective data object during a storage or retrieval transaction, and the register includes a respective first set of parameters corresponding to each respective queue and a respective second set of parameters corresponding to each respective queue.

4. The method of claim 1, wherein each of the first and second sets of parameters includes:
   a number of contiguous sectors of data of an object remaining to be transferred, and
   an address identifying a start of the data remaining to be transferred during the transaction, and
   the register further includes a value that determines a number of sectors of data to be transferred during each transfer.

5. The method of claim 1, wherein the register additionally stores an indicator that indicates whether the first set of parameters or the second set of parameters is currently being used for the current transaction.

6. The method of claim 1, further comprising:
   retrieving the hill sector of data from the computer readable storage medium;
   identifying the number of valid data in the full sector, based on the indicator; and
   storing the valid data in a memory.

7. The method of claim 1, further comprising:
   overwriting the first set of parameters with a third set of parameters while the second transaction is being performed;
   retrieving the third set of parameters from the register automatically when the second transaction is completed, without waiting for a further command from a control processor; and
   performing the third transaction according to the retrieved third set of parameters.

8. The method of claim 1, further comprising:
   providing a data file to be stored to the computer readable storage medium;
   identifying a first object comprising a first portion of the data file to be stored in a first plurality of contiguous sectors of the computer readable storage medium in the first transaction;
   identifying a second object comprising a second portion of the data file to be stored in a second plurality of contiguous sectors of the computer readable storage medium in the second transaction; and
   determining the first and second parameter sets based on the first object identification and the second object identification, wherein the determining step is performed before the step of storing the first and second sets of parameters in the register.

9. The method of claim 1, further comprising:
   receiving a request to retrieve a file of data from the computer readable storage medium;
   identifying a first object comprising a first plurality of contiguous sectors of data within the file to be retrieved in the first transaction;
   identifying a second object comprising a second plurality of contiguous sectors of data within the file to be retrieved in the second transaction; and
   determining the first and second parameter sets based on the first object identification and the second object identification, wherein the determining step is performed before the step of storing the first and second sets of parameters in the register.

10. A system comprising:
    a control processor;
    a computer readable storage medium;
    a register for storing first and second sets of parameters, each set of parameters defining a transaction to transfer data either to or from a computer readable medium; and
    a traffic manager for:
       causing execution of a first transaction according to the first set of parameters;
       causing retrieval of the second set of parameters from the register automatically when the first transaction is completed, without waiting for a further command from the control processor; and
       causing execution of a second transaction according to the retrieved second set of parameters,
    wherein the register additionally stores an indicator that identifies a number of valid data bytes in a final sector of the data to be stored or retrieved during the transaction, and
    wherein pad data is added to the final sector of the data to be stored or retrieved, to form a full sector of data on the computer readable storage medium, if the number of valid data bytes in the final sector is less than a size of the sector.

11. The system of claim 10, wherein each transaction comprises either a storage transaction or a retrieval transaction; the storage transaction transferring data from a memory to at least one disk, and the retrieval transaction transferring data from the at least one disk to the memory.

12. The system of claim 11, wherein the memory includes a plurality of queues, each queue for buffering a respective data object during a transaction, and the register is configures to store a respective first set of parameters corresponding to each respective queue and a respective second set of parameters corresponding to each respective queue.

13. The system of claim 10, wherein each of the first and second sets of parameters includes:
   a number of sectors of data remaining to be transferred during the transaction; and
   an address identifying a start of the data remaining lobe transferred during the transaction.

14. The system of claim 10, wherein the register is additionally configured to store an indicator that indicates whether the first set of parameters or the second set of parameters is currently being used for the current transaction.

15. The system of claim 10, wherein the computer readable storage medium includes a Redundant Array of Inexpensive Disks.

16. A computer readable storage medium encoded with computer program code wherein, when the computer program code is processed by a processor, the processor performs a method comprising time steps of:
   storing first and second sets of parameters in a register, each set of parameters defining a transaction to transfer data to or retrieve data from a storage device;
   performing the first transaction according to a first set of parameters;
   retrieving a second set of parameters from the register automatically when the first transaction is completed, without waiting for a further command from a control processor; and
   performing the second transaction according to the retrieved second set of parameters,
   wherein the register additionally stores an indicator that identifies a number of valid data bytes in a filial sector of the data stored or retrieved during the transaction, and
   wherein pad data is added to the final sector of the data stored or retrieved during the transaction, to form a full sector of data on the storage device, if the number of valid data bytes in the final sector is less than a size of the sector.

17. The computer readable storage medium of claim 16, further comprising:
   providing a data file to be stored to the storage device;
   identifying a first object comprising a first portion of the data file to be stored in a first plurality of contiguous sectors of the storage device in the first transaction;
   identifying a second object comprising a second portion of the data file stored in a second plurality of contiguous sectors of the storage device during the second transaction; and
   determining the first and second parameter sets based on the first object identification and the second object identification, wherein the determining step occurs before the step of storing the first and second sets of parameters in the register.

18. The computer readable storage medium of claim 17, wherein the memory includes a plurality of queues, each queue for buffering a respective data object during a storage or retrieval transaction, and the register is configures to store a respective first set of parameters corresponding to each respective queue and a respective second set of parameters corresponding to each respective queue.

19. The computer readable storage medium of claim 16, further comprising:
   receiving a request to retrieve a file of data from the storage device;
   identifying a first object comprising a first plurality of contiguous sectors of data within the file retrieved during the first transaction;
   identifying a second object comprising a second plurality of contiguous sectors of data within the file retrieved during the second transaction; and
   determining the fast and second parameter sets based on the first object identification and the second object identification, wherein the determining step occurs before the step of storing the first and second sets of parameters in the register.

* * * * *